(12) United States Patent
Ito et al.

(10) Patent No.: US 9,001,198 B2
(45) Date of Patent: Apr. 7, 2015

(54) IMAGE DISPLAY VIEWING SYSTEM, OPTICAL MODULATOR AND IMAGE DISPLAY DEVICE

(75) Inventors: Atsushi Ito, Kanagawa (JP); Kyoichiro Oda, Kanagawa (JP); Toyokazu Ogasawara, Kanagawa (JP); Kazuya Kumazawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 734 days.

(21) Appl. No.: 12/868,276

(22) Filed: Aug. 25, 2010

(65) Prior Publication Data

US 2011/0074939 A1    Mar. 31, 2011

(30) Foreign Application Priority Data

Sep. 30, 2009   (JP) ................................ P2009-225964

(51) Int. Cl.
*H04N 13/00*    (2006.01)
*H04N 13/04*    (2006.01)
*G02B 27/26*    (2006.01)

(52) U.S. Cl.
CPC ................................ *H04N 13/0438* (2013.01)

(58) Field of Classification Search
None
See application file for complete search history.

(56) References Cited

U.S. PATENT DOCUMENTS

| 4,697,910 | A * | 10/1987 | Kasuya | 399/51 |
| 5,091,794 | A * | 2/1992 | Suzuki | 349/181 |
| 5,418,572 | A * | 5/1995 | Nonweiler et al. | 348/446 |
| 6,246,455 | B1 * | 6/2001 | Iijima et al. | 349/65 |
| 6,788,280 | B2 * | 9/2004 | Ham | 345/89 |
| 7,068,241 | B2 * | 6/2006 | Sato et al. | 345/8 |
| 7,123,213 | B2 * | 10/2006 | Yamazaki et al. | 345/7 |

FOREIGN PATENT DOCUMENTS

| JP | 61-227498 | 10/1986 |
| JP | 3701355 | 7/2005 |

* cited by examiner

*Primary Examiner* — Christopher S Kelley
*Assistant Examiner* — Mohammed Jebari
(74) *Attorney, Agent, or Firm* — Sony Corporation

(57) ABSTRACT

There is provided an image display viewing system including an image display device including a signal control portion that receives input of an image signal and outputs a signal that causes each of multiple different images to be displayed at least twice consecutively, and a display panel to which the signal output from the signal control portion is input and which alternately displays each of the multiple different images at least twice consecutively, and an optical modulator including a liquid crystal layer on which an image having a predetermined polarization direction output from the image display device and external light having random polarization are incident, and which periodically changes the polarization direction of the incident light, and a polarizing plate on which light emitted from the liquid crystal layer is incident and which has a polarization axis in a predetermined direction.

15 Claims, 8 Drawing Sheets

WRITE PRINCIPLE AND OPENING AND CLOSING OF SHUTTERS

IMAGE DISPLAY VIEWING SYSTEM, OPTICAL MODULATOR AND IMAGE DISPLAY DEVICE

BACKGROUND OF THE INVENTION

1. Field of the Invention

The present invention relates to an image display viewing system, an optical modulator and an image display device.

2. Description of the Related Art

Recently, a technology such as that described in Japanese Patent No. 3701355, for example, has become known that displays multiple video images on a single screen using time division scheme and that uses glasses with shutters that are synchronized to the timing of the displayed images in order to separate the multiple video images and recognize them individually. A technology such as that described in Japanese Patent Application Publication No. JP-A-1968-227498 is also known that realizes a stereoscopic display using the aforementioned technology by displaying parallax images that respectively correspond to the left and right eyes.

SUMMARY OF THE INVENTION

These two technologies are substantially the same in terms of hardware, and they differ only in the video content they display and the operating of the shutters. That is, if the shutters that respectively correspond to the left and right eyes open and close in the same phase, the multiple video images can be selectively displayed, and if the shutters open and close in opposite phases, such that the two images serve as parallax images, the stereoscopic image can be displayed.

Incidentally, the vertical synchronization frequency of a television receiver is 60 Hz in the case of the NTSC system and 50 Hz in the case of the PAL and SECAM systems. Therefore, the glasses with the shutters perform their opening and closing operations in synchronization at a frequency of 60 Hz or 50 Hz.

On the other hand, the frequency of commercial power supply that is used for external light source such as an indoor fluorescent lamp and the like, for example, is also 50 Hz or 60 Hz, and a fluorescent lamp that is not of the inverter type flickers at double the frequency above, namely at a frequency of 100 Hz or 120 Hz.

In a case where a fluorescent lamp and the glasses with the shutters are used separately, the frequency is so high that the human eye does not perceive it, but if the fluorescent lamp is seen over the tops of the shutters, a flickering is perceived due to the difference in frequency between the operating frequency of the shutters and the flicker frequency of the fluorescent lamp. For example, in a case where a 60 Hz video signal is watched in an environment where the commercial frequency is 50 Hz, the flickering of the light at a frequency of 20 Hz or 40 Hz, which is the difference between the two frequencies, is transmitted through the shutters and is visually perceived. In this case, even if no flickering of the display screen itself is perceived, flickering is easily perceived in the area around the screen, such as on a wall that is illuminated by a fluorescent lamp, for example, and this will sometimes make a user feel uncomfortable.

Further, in the case of a liquid crystal display panel, images are displayed in a line sequential manner from an upper side in the vertical direction. In this case, different images are simultaneously displayed on an upper section and a lower section of the screen due to an insufficient response speed of liquid crystal. As a result, there is a possibility of the occurrence of crosstalk.

In light of the foregoing, it is desirable to provide an image display viewing system, an optical modulator and an image display device that are novel and improved and that, through the use of a simple structure, are capable of reliably suppressing, through the use of a simple structure, flickering of light from an external light source and inhibiting the occurrence of crosstalk.

According to an embodiment of the present invention, there is provided an image display viewing system including an image display device including a signal control portion that receives input of an image signal and outputs a signal that causes each of multiple different images to be displayed at least twice consecutively, and a display panel to which the signal output from the signal control portion is input and which alternately displays each of the multiple different images at least twice consecutively, and an optical modulator including a liquid crystal layer on which an image having a predetermined polarization direction output from the image display device and external light having random polarization are incident, and which periodically changes the polarization direction of the incident light, and a polarizing plate on which light emitted from the liquid crystal layer is incident and which has a polarization axis in a predetermined direction.

The image display device may include a $1/4\lambda$ wavelength plate that converts the image having the predetermined polarization direction to circularly polarized light. The optical modulator may include a $1/4\lambda$ wavelength plate which is disposed closer to the image display device than the liquid crystal layer and which once more converts the circularly polarized light to the predetermined polarization direction.

The liquid crystal layer may rotate the polarization direction of the incident light depending on whether or not a voltage is applied, and may control transmission and non-transmission of light through the polarizing plate.

The optical modulator may be disposed in front of a right eye and in front of a left eye of an observer. The multiple different images may be an image for the right eye that is visually recognized by the right eye and an image for the left eye that is visually recognized by the left eye. The liquid crystal layer may control the transmission and non-transmission of light through the polarizing plate such that the image for the right eye is incident on the right eye and the image for the left eye is incident on the left eye, in response to switching between the image for the right eye and the image for the left eye that are periodically output from the image display device.

The optical modulator may be disposed in front of a right eye and in front of a left eye of an observer. The multiple different images may be images that are visually recognized by different users, respectively. The transmission and non-transmission of light through the polarizing plate may be controlled such that one of the multiple different images is incident on both the right eye and the left eye, in response to switching between the multiple different images that are periodically output from the image display device.

According to another embodiment of the present invention, there is provided an optical modulator including a liquid crystal layer on which images having a predetermined polarization direction that are periodically output from an image display device and external light having random polarization are incident, and which periodically changes the polarization direction of the incident light, the images being multiple different images that are respectively output at least twice consecutively, and a polarizing plate on which light emitted from the liquid crystal layer is incident and which has a polarization axis in a predetermined direction.

The images output from the image display device may be images of circularly polarized light converted from the images having the predetermined polarization direction. The optical modulator may further include a ¼λ wavelength plate which is disposed closer to the image display device than the liquid crystal layer and which once more converts the circularly polarized light to the predetermined polarization direction.

The liquid crystal layer may rotate the polarization direction of the incident light depending on whether or not a voltage is applied, and may control transmission and non-transmission of light through the polarizing plate.

The optical modulator may be disposed in front of a right eye and in front of a left eye of an observer. The multiple different images may be an image for the right eye that is visually recognized by the right eye and an image for the left eye that is visually recognized by the left eye. The liquid crystal layer may control the transmission and non-transmission of light through the polarizing plate such that the image for the right eye is incident on the right eye and the image for the left eye is incident on the left eye, in response to switching between the image for the right eye and the image for the left eye that are periodically output from the image display device.

The optical modulator may be disposed in front of a right eye and in front of a left eye of an observer. The multiple different images may be images that are visually recognized by different users, respectively. The transmission and non-transmission of light through the polarizing plate may be controlled such that one of the multiple different images is incident on both the right eye and the left eye, in response to switching between the multiple different images that are periodically output from the image display device.

According to another embodiment of the present invention, there is provided an image display device including a signal control portion that receives input of an image signal and outputs a signal that causes each of multiple different images to be displayed at least twice consecutively, a display panel to which the signal output from the signal control portion is input and which alternately displays each of the multiple different images at least twice consecutively and a ¼λ wavelength plate that converts polarized light of the multiple different images to circularly polarized light, where the image display device outputs the multiple different images to an optical modulator that has, on a front surface of a liquid crystal layer, a ¼λ wavelength plate converting the circularly polarized light to a predetermined polarization direction and performing a shutter operation by the liquid crystal layer.

According to the embodiments of the present invention described above, it is possible to reliably suppressing, through the use of a simple structure, flickering of light from an external light source, and to inhibit the occurrence of crosstalk.

DETAILED DESCRIPTION OF THE EMBODIMENT(S)

Figure 1:
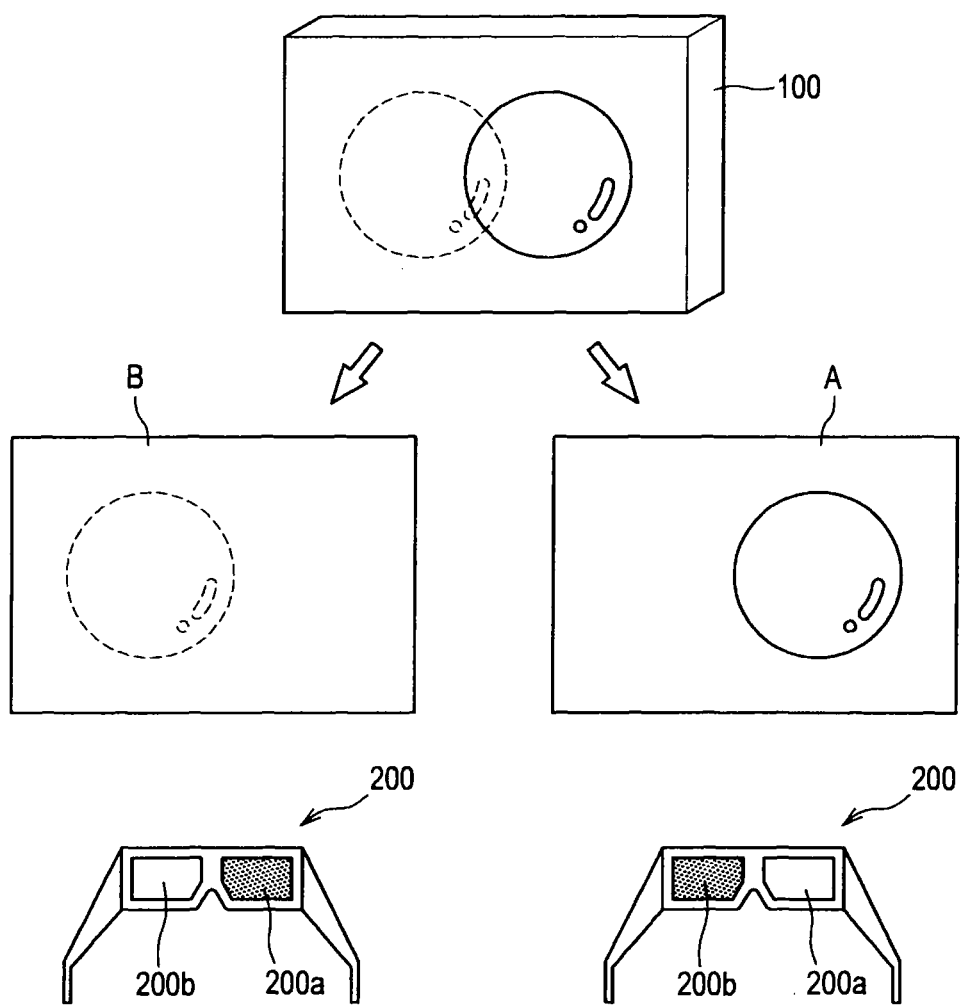
FIG. 1 is a schematic drawing that shows a configuration of a stereoscopic image display viewing system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Explanation will be made in the following order.
1. Overall configuration of video image display system
2. Example of configuration of image display device
3. Example of "write twice" according to present embodiment
4. Occurrence factors of flicker due to external light source such as fluorescent lamp
5. Detailed structure of video image display system of present embodiment
6. Application to system that periodically displays multiple different images 1. Overall Configuration of Video Image Display System FIG. 1 is a schematic drawing that shows a configuration of a stereoscopic image display viewing system according to an embodiment of the present invention. As shown in FIG. 1, the system according to the present embodiment is provided with an image display device 100 that includes an LCD, as well as displayed image viewing glasses (optical modulators) 200. The image display device 100 is provided with a drive circuit that drives a display panel and with a transmitter that receives a vertical synchronization signal from the drive circuit and outputs a signal to the displayed image viewing glasses 200, and the image display device 100 can be driven at double speed. The displayed image viewing glasses 200 have a function of receiving signals transmitted from the transmitter of the image display device 100 and are also provided with liquid crystal shutters 200a, 200b that, based on the received signals, select video images by opening and closing the shutters according to video images displayed on the display panel.

The image display device 100 may be a stereoscopic video image display device using time division scheme, for example, and may display an image for the left eye and an image for the right eye in alternation on the entire display panel in an extremely short cycle. Further, the image display device 100 may provide images separately to the left eye and the right eye in synchronization with the display cycles of the image for the left eye and the image for the right eye. The image display device 100 may, for example, display an image R for the right eye and an image L for the left eye in alternation in separate fields. The pair of the liquid crystal shutters 200a, 200b are provided in portions of the displayed image viewing glasses 200 where lenses would normally be placed. The liquid crystal shutters 200a, 200b alternately perform opening and closing operations in synchronization with the switching of the images in the separate fields of the image display device 100. That is, for the field in which the image A for the right eye is displayed on the image display device 100, the liquid crystal shutter 200b for the left eye is in a closed state, and the liquid crystal shutter 200a for the right eye is in an open state. For the field in which the image B for the left eye is displayed, the opposite shutter operations are performed. Thus, the image display device 100 displays the image A and the image B in alternation in an extremely short cycle and simultaneously provides the images to the left eye and the right eye in synchronization with the display cycle for the image A and the image B.

This sort of operation causes only the image A to be visible to the right eye of a user who is wearing the viewing glasses 200 and looking at the image display device 100 and causes only the image B to be visible to the left eye of the user. The images for the right eye and the left eye are therefore combined behind the eyes of the user, such that the images displayed on the image display device 100 are perceived stereoscopically. The image display device 100 can also display an ordinary two-dimensional image, and in that case, the switching of the image A and the image B is not performed.

2. Example of Configuration of Image Display Device

Figure 2:
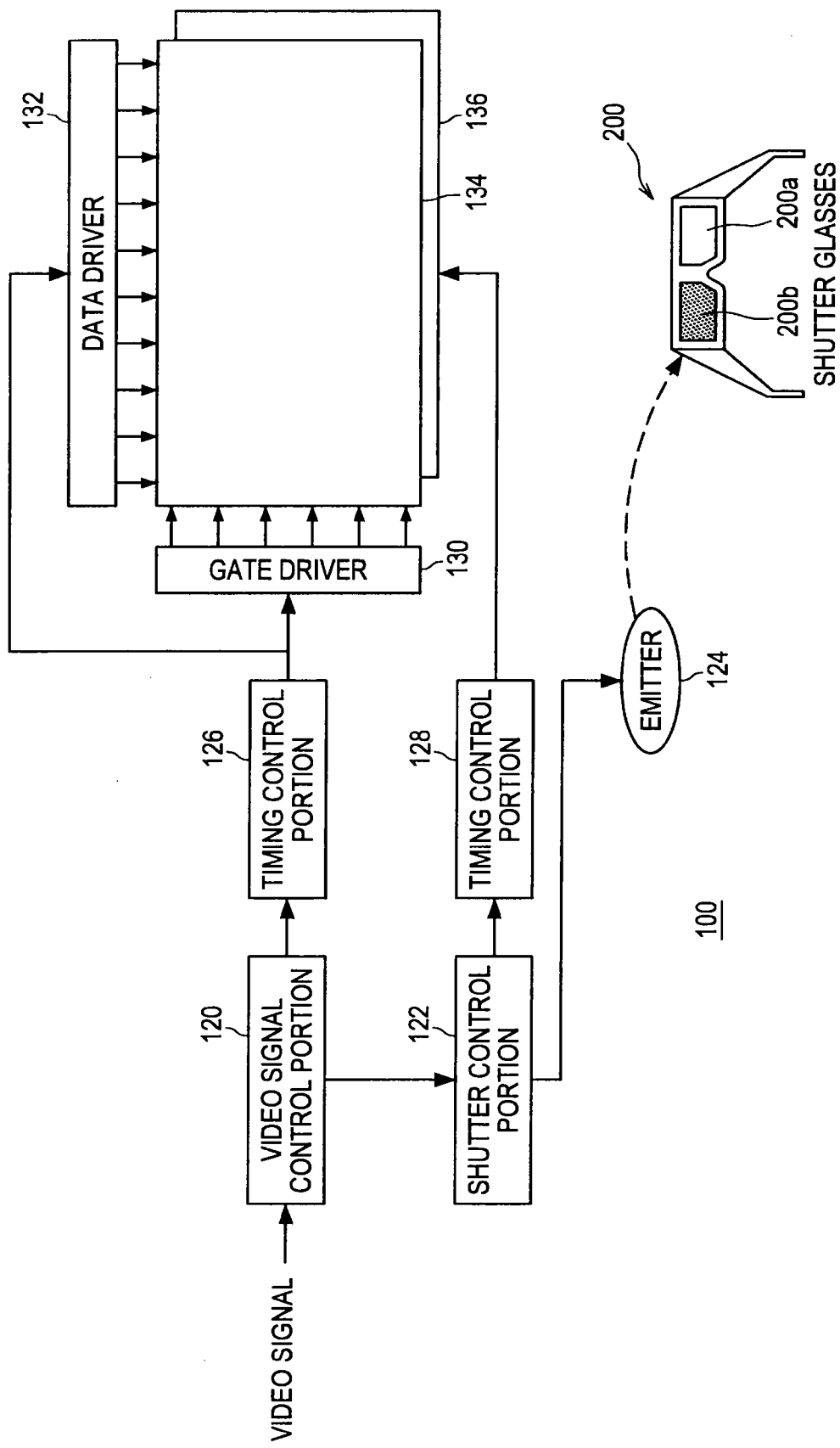
FIG. 2 is a block diagram that shows a configuration of an image display device.

Next, a configuration of the image display device 100 will be explained. FIG. 2 is a block diagram that shows the configuration of the image display device 100. As shown in FIG. 2, the image display device 100 is provided with a video signal control portion 120, a shutter control portion 122, an emitter 124, a timing control portion 126, a backlight control portion 128, a gate driver 130, a data driver 132, and a liquid crystal display panel 134. A backlight (surface light source) 136 is disposed behind the liquid crystal display panel 134.

The liquid crystal display panel 134 includes a liquid crystal layer, transparent electrodes which face with each other and sandwich the liquid crystal layer, a color filter, and the like. A video signal for displaying the image A for the right eye and the image B for the left eye is input to the video signal control portion 120. The video signal control portion 120 outputs the left video signal and the right video signal in alternation in order to cause the image A for the right eye and the image B for the left eye to be displayed alternately on the liquid crystal display panel 134. Further, the video signal control portion 120 performs conversion, based on the input left and right video signals, for the writing as described hereafter so that two same signals are output consecutively for each of the video signals for the right eye and for the left eye.

The video signal for the right eye and the video signal for the left eye that are converted by the video signal control portion 120 are input to the timing control portion 126. The timing control portion 126 converts the video signal for the right eye and the video signal for the left eye, which are input, into signals to be input to the liquid crystal display panel 134 and also generates pulse signals that are used in operations of the gate driver 130 and the data driver 132.

The signals that are converted by the timing control portion 126 are input to the gate driver 130 and the data driver 132, respectively. The gate driver 130 and the data driver 132 receive the pulse signals that are generated by the timing control portion 126 and cause the individual pixels in the liquid crystal display panel 134 to emit light based on the signals that are input. A video image is thus displayed on the liquid crystal display panel 134.

The video signal control portion 120 also transmits to the shutter control portion 122 a timing signal that indicates the timing for switching between the video signal for the right eye and the video signal for the left eye. Based on the timing signal that is transmitted from the video signal control portion 120, the shutter control portion 122 transmits to the emitter 124 a drive signal that causes the emitter 124 to emit light. The drive signal is a signal that includes the opening and closing timings for the liquid crystal shutters 200a, 200b, and the shutter control portion 122 controls the opening and closing timings for the liquid crystal shutters 200a, 200b according to the timing signal that is transmitted from the video signal control portion 120. Based on the drive signal that is transmitted from the shutter control portion 122, the emitter 124 transmits to the viewing glasses 200 an optical signal that indicates the opening and closing timings for the right and left liquid crystal shutters 200a, 200b. Besides, the drive signal causing the emitter 124 to emit light may use, during the opening period, values that are held on the side of the displayed image viewing glasses 200 as those that include the timing for switching between the image A and the image B.

The displayed image viewing glasses 200 are provided with sensors that receive optical signals, although these will not be explained in detail. Upon receiving the optical signals, the displayed image viewing glasses 200 perform opening and closing operations of the liquid crystal shutters 200a, 200b in synchronization with the opening and closing timings for the liquid crystal shutters 200a, 200b that are indicated by the optical signals.

The shutter control portion 122 also transmits to the backlight control portion 128 a timing signal that indicates the timing of the switching between the left and right images. Based on the timing signal that is input, the backlight control portion 128 outputs a control signal for causing the backlight 136 to turn on. The backlight 136 is turned on based on the control signal that is input from the backlight control portion 128.

Besides, a liquid crystal display device is used as an example of the image display device 100, but the present invention is not limited to this example, and any device that is capable of displaying at an integral multiple of a television vertical synchronization frequency, such as a CRT, a PDP, and EL, or the like, may be used as the image display device 100.

The liquid crystal shutters 200a, 200b of the displayed image viewing glasses 200 may include liquid crystal shutters having TN liquid crystals, for example, and the transmissivity and non-transmissivity of light through the shutters can be selected by turning a voltage on and off.

Figure 3:
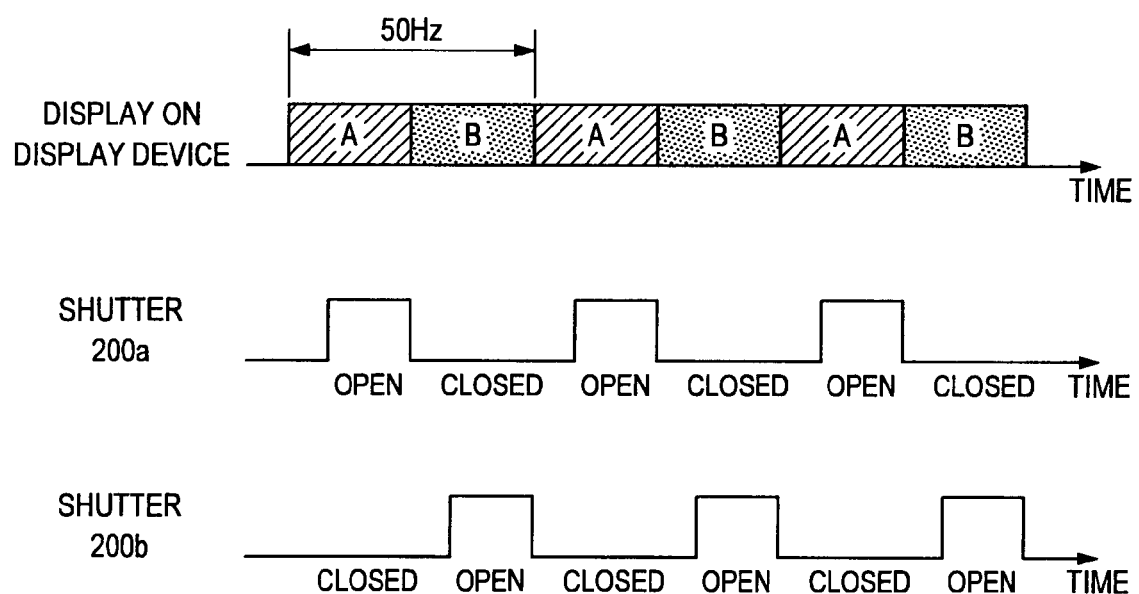
FIG. 3 is a timing chart that shows timings of displays of video images on the image display device and opening and closing timings of liquid crystal shutters.

FIG. 3 is a timing chart that shows the timings of the displays of the video images on the image display device 100 and the opening and closing timings of the liquid crystal shutters 200a, 200b. As shown in FIG. 3, the video images that are displayed on the image display device 100 are classified into the image A for the right eye and the image B for the left eye, and an observer sees the image A while the liquid crystal shutter 200a is open and sees the image B while the liquid crystal shutter 200b is open. The source of the video images that are displayed may be a 50 Hz in the case of PAL.

As shown in the FIG. 3, first, the image A starts to be displayed on the image display device 100, and at the time when the liquid crystal response time has elapsed and the image A is completely displayed, the liquid crystal shutter 200a is brought into the open state. This allows the right eye of the observer to perceive the image A. Next, when the image B starts to be displayed, the liquid crystal shutter 200a is brought into the closed state, such that the transmission of the image B through the liquid crystal shutter 200a is cut off (blocked).

Next, when the image B is completely displayed, the liquid crystal shutter 200b is brought into the open state, and the left eye of the observer perceives the image B. Because the image A and the image B are thus perceived in alternation, the parallax difference between the image A and the image B allows the observer to perceive a stereoscopic image.

The periods during which the liquid crystal shutters 200a, 200b are each open are determined by the image display device 100 and the response speed of the liquid crystal shutters 200a, 200b. In the present embodiment, the period is set to five milliseconds as an example. The opening and closing timings of the liquid crystal shutters 200a, 200b are determined according to the characteristics of the image display device 100, and the actual opening and closing timings and the method of displaying the images A, B can be adjusted as desired.

As described above, displaying of the images A, B in alternation on the single image display device 100 and opening and closing of the liquid crystal shutters 200a, 200b of the displayed image viewing glasses 200 in synchronization with the displaying of the images make it possible for the observer to perceive a stereoscopic image.

3. Example of "Write Twice" According to Present Embodiment

When the display panel of the image display device 100 is formed of a liquid crystal display panel as in the present embodiment, images are displayed in a line sequential manner from an upper side in the vertical direction of the liquid crystal display panel. In this case, the image A for the right eye and the image B for the left eye are simultaneously displayed on an upper section and a lower section of the screen due to an insufficient response speed of the liquid crystal. As a result, there is a possibility of the occurrence of crosstalk. Therefore, in order to inhibit the occurrence of crosstalk due to an insufficient response speed of the liquid crystal, and luminance insufficiency etc., the present embodiment adopts a technique that increases a driving frequency of the liquid crystal panel, and causes the liquid crystal display panel 134 to display (write) twice one frame for the left or right image.

FIG. 4 is a timing chart that shows a principle of "write twice" according to the present embodiment, and opening and closing timings of the liquid crystal shutters 200a, 200b. FIG. 4 shows a case in which the image A for the right eye and the image B for the left eye are each displayed at a driving frequency of 240 Hz. In FIG. 4, a time period during which the image A for the right eye or the image B for the left eye is displayed by one write operation is 1/240 Hz=4.2 ms.

Figure 4A:
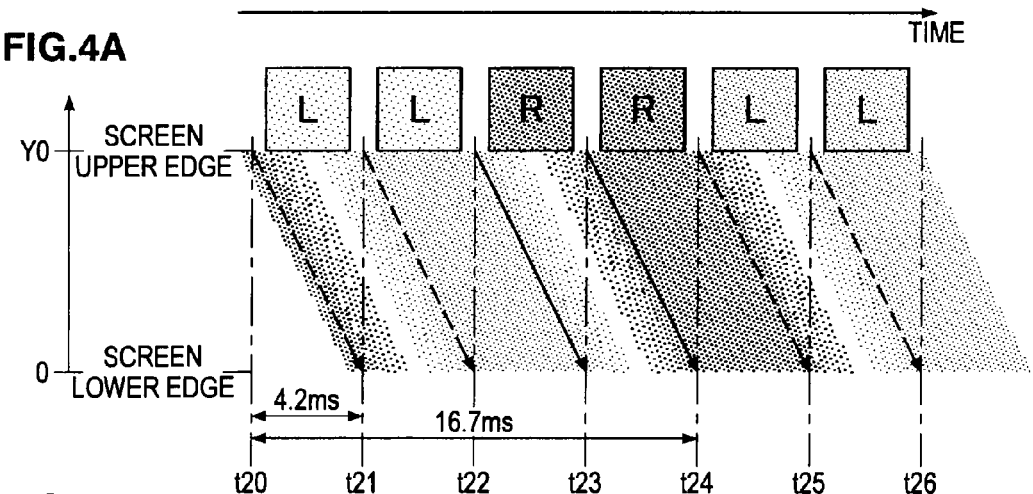
FIGS. 4A-4D are timing charts that shows a principle of "write twice" according to the embodiment of the present invention, and opening and closing timings of the liquid crystal shutters.
Figure 4B:
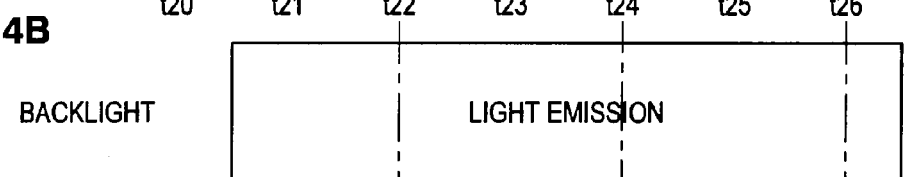

FIG. 4A shows a manner in which luminance varies over time, at each position in the vertical direction from a lower edge (Y=0) to an upper edge (Y=Y0) of the screen of the liquid crystal display panel 134. FIG. 4B shows a manner in which the backlight 136 of the liquid crystal display panel 134 emits light. As shown in FIG. 4B, in the present embodiment, the backlight 136 is constantly turned on. However, the backlight 136 may be turned on in accordance with open periods of the liquid crystal shutters 200a, 200b, under control of the backlight control portion 128.

Figure 4C:
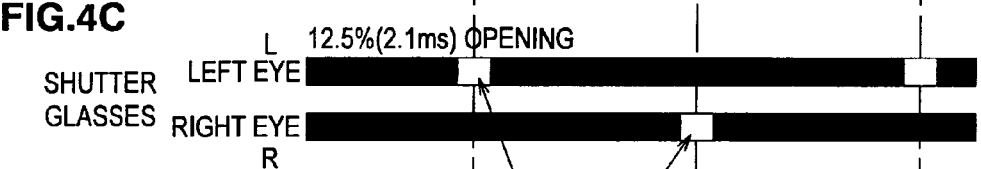
Figure 4D:
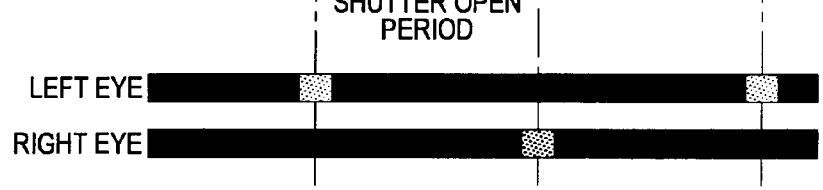

FIG. 4C shows opening and closing timings of the liquid crystal shutters 200a, 200b. FIG. 4D shows a state in which the image R for the right eye is incident on the right eye of the user who is wearing the displayed image viewing glasses 200, and the image L for the left eye is incident on the left eye of the user.

As shown in FIG. 4A, at the upper edge (Y=Y0) of the screen, the image L for the left eye is written during a time period of 4.2 ms from a time t20 to a time t21. Following this, the image L for the left eye is written again during a time period of 4.2 ms from the time t21 to a time t22. Here, the image L for the left eye that is written from the time t20 to the time t21 and the image L for the left eye that is written from the time t21 to the time t22 are basically the same images. However, they may be different from each other due to an adjustment such as overdrive processing. The overdrive processing may be processing that compares, in a second write operation, an actual signal level with a video signal level (a drive amount) in a first write operation, and corrects the luminance value that has not been reached by the first write operation, or may be processing that corrects a swing back phenomenon. Further, overdrive processing can be performed also in the first write operation. The processing described above can be performed by the timing control portion 126. The timing control portion 126 also functions as a luminance correction portion by the overdrive processing and the like. In addition, a predetermined blank period may be provided between the image L for the left eye that is written for the first time and the image L for the left eye that is written for the second time.

After writing the image L for the left eye twice, the image R for the right eye is written. Also regarding the image R for the right eye, at the upper edge (Y=Y0) of the screen, the image R for the right eye is written during a time period of 4.2 ms from the time t22 to a time t23. Following this, the image R for the right eye is written again during a time period of 4.2 ms from the time t23 to a time t24. The image R for the right eye that is written from the time t22 to the time t23 and the image R for the right eye that is written from the time t23 to the time t24 are basically the same images. However, they may be different from each other due to an adjustment such as the overdrive processing. In addition, a predetermined blank period may be provided between the image R for the right eye that is written for the first time and the image R for the right eye that is written for the second time, or between the image L for the left eye and the image R for the right eye.

Generally, a liquid crystal display device has a relatively low response time. Therefore, if writing time is short, each pixel does not reach a desired luminance. For that reason, if the driving frequency is increased and the image A for the right eye and the image B for the left eye are alternately written, the time for one write operation becomes shorter than 4.2 ms, and the desired luminance is reached only after the first write operation. As a result, there is no timing at which the luminance of both the upper edge and the lower edge of the screen has reached the desired luminance.

In the present embodiment, each of the image A for the right eye and the image B for the left eye is written twice consecutively. Therefore, at the time of the second write operation, the same image has already been written in the first write operation, so the desired luminance can be maintained. Thus, the desired luminance can be reached at both the upper edge and the lower edge of the screen.

At the time t22 shown in FIG. 4A, the luminance of the image L for the left eye has reached the desired level in the whole region from the upper edge of the screen to the lower edge of the screen. Therefore, if the liquid crystal shutter 200b is opened only during a predetermined time period (for example, 2.1 ms) centered on the time t22 as shown in FIG. 4C and FIG. 4D, the image L for the left eye alone is visually recognized by the left eye of the user. Thus, it is possible to reliably inhibit the occurrence of crosstalk. Note that crosstalk and luminance have a trade-off relationship. Therefore, depending on which one is given priority, the shutter open period can be set as appropriate.

In a similar manner to the above, also regarding the image R for the right eye, at the time t24 shown in FIG. 4A, the luminance of the image R for the right eye has reached the desired level in the whole region from the upper edge of the screen to the lower edge of the screen. Therefore, if the liquid crystal shutter 200a is opened only during a predetermined time period (for example, 2.1 ms) centered on the time t24 as shown in FIG. 4C and FIG. 4D, the image R for the right eye alone is visually recognized by the right eye of the user. Thus, it is possible to reliably inhibit the occurrence of crosstalk.

As described above, if the driving frequency of the liquid crystal is increased, at the time of the first write operation, the desired luminance is not reached in the lower section of the screen when the writing is completed. Therefore, the liquid crystal shutters 200a, 200b are closed at least during some period of the first write operation during transient response of the liquid crystal display panel 134. More specifically, the liquid crystal shutters 200a, 200b are closed at least during a period of 4.2 ms that corresponds to 50 percent of approximately 8.4 ms during which the image A for the right eye or the image B for the left eye is displayed. As a result, it is possible to avoid a situation in which the video image during the transient response by the first write operation is visually recognized by the user. Further, in order to inhibit crosstalk, a period is provided in which both the liquid crystal shutters 200a, 200b are closed.

In the present embodiment, as shown in FIG. 4C, the liquid crystal shutter R (the liquid crystal shutter 200a) for the right eye is opened only during the predetermined time period (2.1 ms) centered on the time t24. Further, the liquid crystal shutter L (the liquid crystal shutter 200b) for the left eye is opened only during the predetermined time period (2.1 ms, for example) centered on the time t22 and a time t26.

At the time t24, the second write operation of the image A for the right eye is started at the lower edge of the screen, and the second write operation of the image A for the right eye is completed at the upper edge of the screen. Therefore, if the liquid crystal shutter 200a is opened at the time t24, the image A for the right eye by the first write operation is not visually recognized by the right eye of the user. Thus, the image A for the right eye by the second write operation is visually recognized by the right eye of the user in the whole region from the lower edge to the upper edge of the screen.

In a similar manner to the above, at the time t22 and at the time t26, the second write operation of the image B for the left eye is started at the lower edge of the screen, and the second write operation of the image B for the left eye is completed at the upper edge of the screen. Therefore, if the liquid crystal shutter 200b is opened at the time t22 or at the time t26, the image B for the left eye by the first write operation is not visually recognized by the left eye of the user. Thus, the image B for the left eye by the second write operation is visually recognized by the left eye of the user in the whole region from the lower edge to the upper edge of the screen.

In this manner, the desired luminance is reached by the first write operation, and the luminance is maintained when the second write operation is performed. Therefore, the video image whose luminance has reached the desired luminance can be visually recognized on the entire screen by the user. Accordingly, if the liquid crystal shutters 200a, 200b are opened only during a minimum predetermined time period (2.1 ms, for example) at the time t22, t24 and t26 shown in FIG. 4C, it becomes possible to reliably inhibit the occurrence of crosstalk. Particularly, if the open period of each of the liquid crystal shutters 200a, 200b is set before the switching timing at which the image A for the right eye switches to the image B for the left eye at the upper edge of the screen, or before the switching timing at which the image B for the left eye switches to the image A for the right eye at the upper edge of the screen, it is possible to reliably inhibit the occurrence of crosstalk.

As described above, according to the example of "write twice" of the present embodiment, it becomes possible to reliably inhibit the occurrence of crosstalk in which the image A for the right eye and the image B for the left eye are mixed.

Besides, when "write twice" as in the present embodiment is not performed, if the image A for the right eye and the image B for the left eye are alternately displayed with a low frequency at which the liquid crystal can respond, flicker (flickering on the screen) occurs. The flicker occurs when the driving frequency at which one frame of the image A for the right eye or the image B for the left eye is displayed is set to be equal to or less than 60 Hz, for example. In the present embodiment, the driving frequency of the liquid crystal is set to 240 Hz, for example. Therefore, it is possible to reliably inhibit the occurrence of flicker.

4. Occurrence Factors of Flicker Due to External Light Source Such as Fluorescent Lamp Next, a relationship between the liquid crystal shutters 200a, 200b and a fluorescent lamp (an external light source) that is used for indoor lighting will be explained based on FIG. 5. In the present embodiment, as an example, the frequency of a commercial power supply that allows the fluorescent lamp to emit light is set to 50 Hz, and the period during which the shutters are open in the case of two-image display based on the NTSC (National Television Standards Committee) signal is set to five milliseconds.

The fluorescent lamp is not an inverter type, but is one that uses a ballast. Because the ballast is used, the fluorescent lamp oscillates at 100 Hz, which is two times the commercial frequency of 50 Hz, so its cycle is ten milliseconds. In contrast, the liquid crystal shutters 200a, 200b open and close in alternation at 59.94 Hz vertical synchronization frequency of the NTSC system, so their cycle is 16.7 milliseconds. In other words, as shown in FIG. 5, the liquid crystal shutters 200a, 200b alternately open for periods of five milliseconds at intervals of 16.7 milliseconds.

Figure 5:
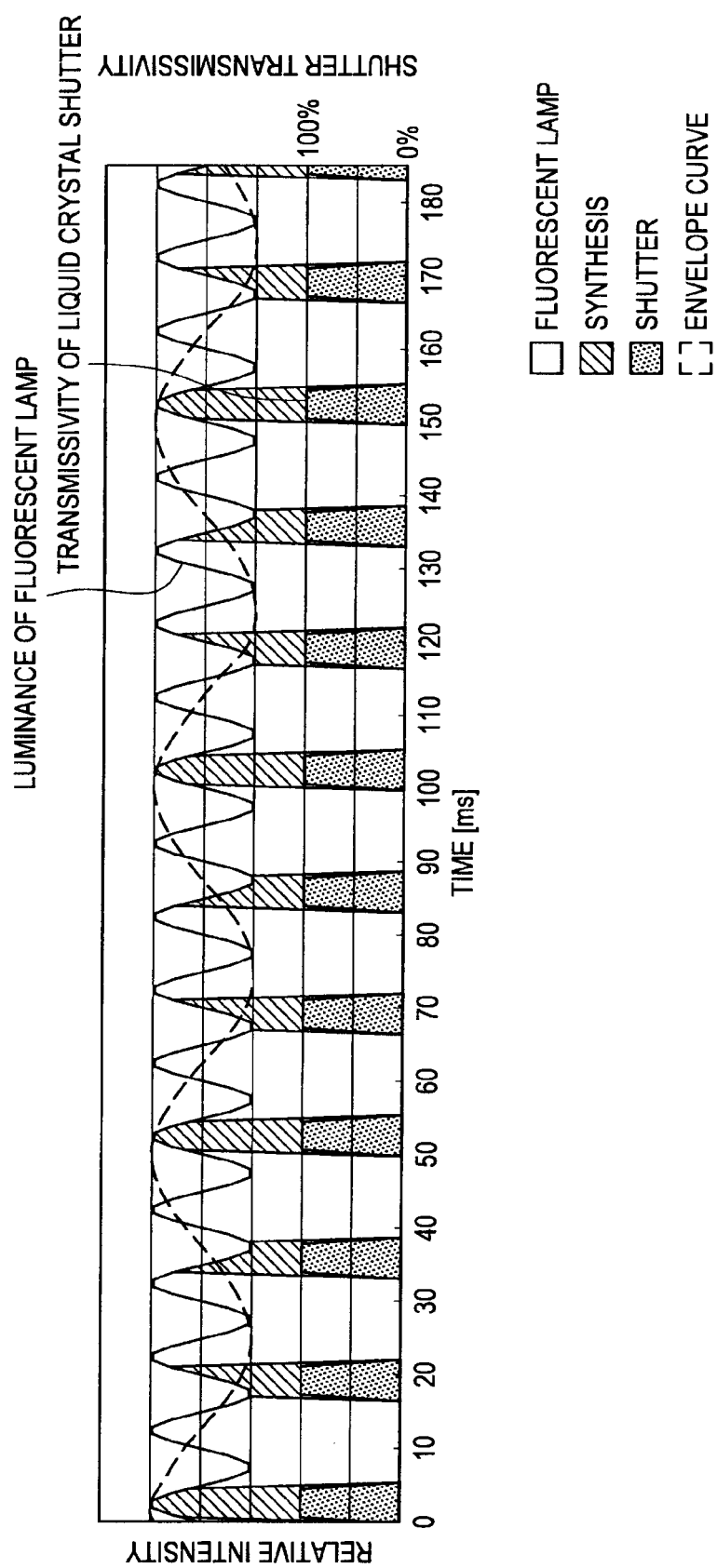
FIG. 5 is a characteristic diagram that illustrates a relationship between the liquid crystal shutters and a fluorescent lamp (an external light source) that is used for indoor lighting.

FIG. 5 shows how the luminance (the relative intensity) of the fluorescent lamp and the transmission factor of the liquid crystal shutters 200a, 200b vary (from zero to 100% in this case) over time. As shown in FIG. 5, the luminance of the fluorescent lamp varies in intensity on a ten-millisecond cycle. The transmission factor of the liquid crystal shutters 200a, 200b is varied cyclically by the opening and closing of the shutters on the 16.7-millisecond cycle. Due to the response characteristics of the liquid crystal shutters 200a, 200b, there exist transition periods that result from response delays from when the shutters start to open until they are completely open and from when they start to close until they are completely closed.

The amounts of light that pass through the liquid crystal shutters 200a, 200b and reach the eyes of the observer are expressed as the products of the luminance of the fluorescent lamp and the respective transmission factors of the liquid crystal shutters 200a, 200b, and they can be shown as relative intensities by the diagonally shaded areas in FIG. 5. The amount of light that the human eye senses is the value of the integral of the respective areas that are diagonally shaded in FIG. 5, but if this value is drawn as an envelope curve along the time axis, it shows an undulating waveform like that indicated by the broken line in FIG. 5. The frequency of the undulating waveform is derived by superimposing the difference between two times the frequency of the liquid crystal shutters 200a, 200b and the light emission frequency of the fluorescent lamp (2×59.94−100=19.88 Hz) and the difference between the frequency of the liquid crystal shutters 200a, 200b and the light emission frequency of the fluorescent lamp (100−59.94=40.06 Hz). Generally, the human eye perceives flicker at a frequency no greater than 50 Hz to 60 Hz as a flickering of the light, so under the circumstances where the (approximately 50 Hz) undulating waveform like that shown in FIG. 5 is generated, an easily recognizable flicker (flickering of the light) is perceived, and an impression of discomfort is given to the observer.

As described above, in a case where the light from a luminous body such as a fluorescent lamp or the like is perceived directly by an observer, the frequency is high, so it does not become a factor in flicker, but if the shutter operations by the liquid crystal shutters 200a, 200b are superimposed on the light, then flicker is perceived.

5. Detailed Structure of Video Image Display System of Present Embodiment

In order to eliminate the flicker described above, in the present embodiment, polarization (polarized light) output from the image display device 100 is brought into a certain state, with respect to light from an external light source that is considered to have random polarization, and a difference between them is used to eliminate the flicker. If the incident light is separated using polarization in this manner, the function of the liquid crystal shutters 200a, 200b is not substantially operated with respect to the light from the external light source, and the liquid crystal shutters 200a, 200b can be caused to function only for the polarization of the image displayed on the image display device 100. As a result, it is possible to completely eliminate the flicker with respect to light from external light sources including a fluorescent lamp. Details will be described below.

Figure 6:
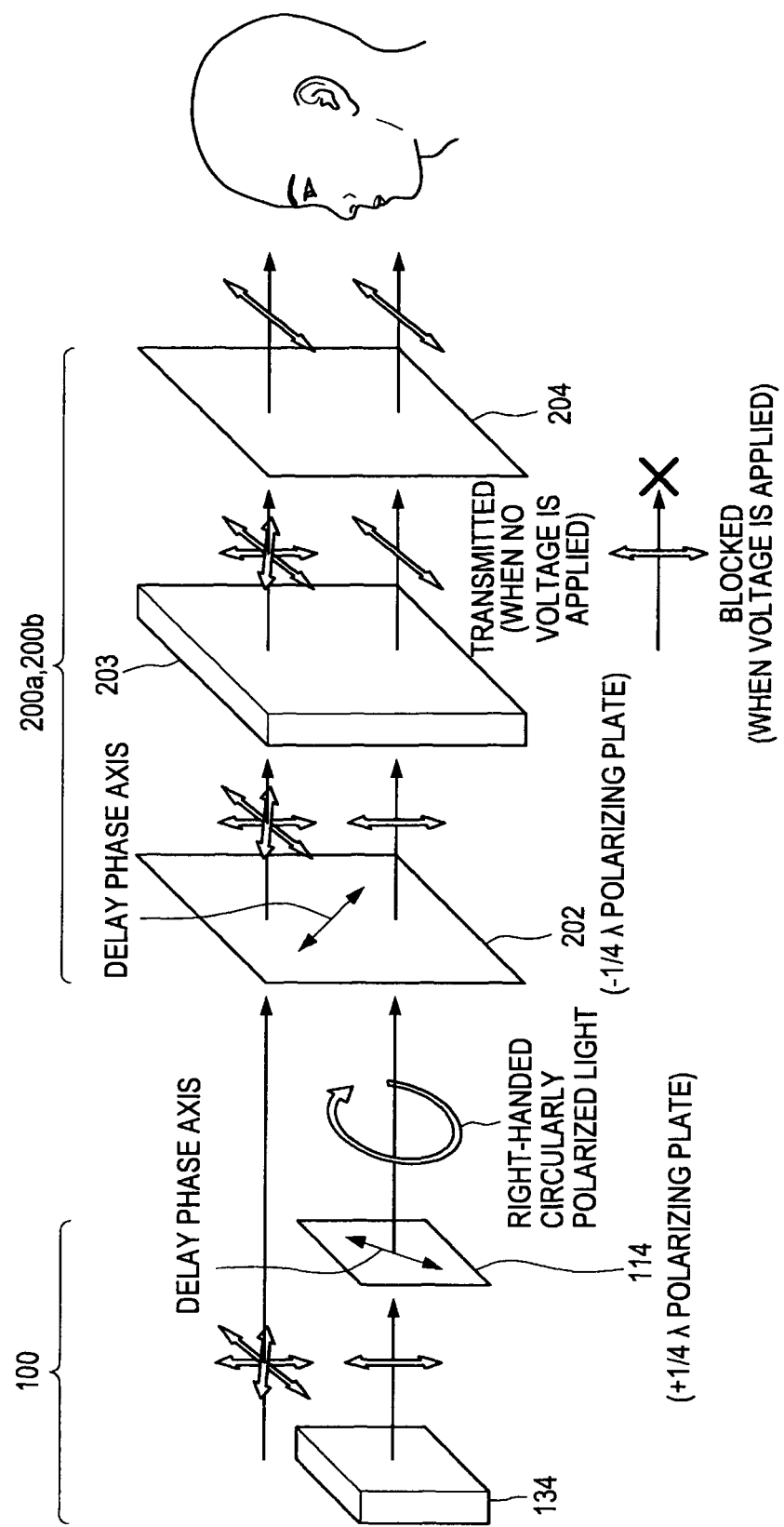
FIG. 6 is a schematic drawing that shows a detailed structure of a video image display system according to the present embodiment.

FIG. 6 is a schematic drawing that shows a detailed structure of the video image display system according to the present embodiment. As shown in FIG. 6, the image display device 100 includes the liquid crystal display panel 134 that displays video images, and a +¼ wavelength plate 114 provided on the display screen of the liquid crystal display panel 134.

On the other hand, the displayed image viewing glasses 200 are provided with a −¼ wavelength plate 202, a switching liquid crystal (a liquid crystal layer) 203 and a polarizing plate 204, which are disposed in this order from the image display device 100 side. The liquid crystal shutters 200a, 200b are each formed by the −¼ wavelength plate 202, the switching liquid crystal 203 and the polarizing plate 204.

When the liquid crystal display panel 134 of the image display device 100 is a VA mode liquid crystal display panel, video image information is output from the liquid crystal display panel 134 in a vertically polarized state. In the image display device 100 of the present embodiment, the +¼ wavelength plate 114 is provided on a front surface of the liquid crystal display panel 134 such that a delay phase axis of the +¼ wavelength plate 114 is inclined by +45 degrees in the vertical direction. Therefore, the light output from the image display device 100 is output as right-handed circularly polarized light.

On the other hand, the light from various luminous bodies including a fluorescent lamp is output as randomly polarized light, and enters the −¼ wavelength plate 202 of the displayed image viewing glasses 200.

In this manner, the light of the video image output from the image display device 100 and the light output from an external luminous body such as a fluorescent lamp have polarization states that are different from each other, and enter the −¼ wavelength plate 202 provided on the surface of the displayed image viewing glasses 200.

The −¼ wavelength plate 202 is provided on the surface of the displayed image viewing glasses 200 such that its delay phase axis is inclined by −45 degrees in the vertical direction. Therefore, the polarization state of the right-handed circularly polarized light output from the image display device 100 is converted again by the −¼ wavelength plate 202, and the right-handed circularly polarized light is thereby changed to vertically polarized light, which enters the switching liquid crystal 203.

The switching liquid crystal 203 is formed by a nematic liquid crystal layer, for example. In the present embodiment, a twist nematic (TN) type liquid crystal with a twist angle of 90 degrees is used. The switching liquid crystal 203 includes a pair of transparent electrodes (not shown in the drawings) on front and rear surfaces of the switching liquid crystal 203. In a state where no voltage is applied between the pair of transparent electrodes, liquid crystal molecules of the liquid crystal layer are twisted by 90 degrees. Therefore, the light emitted from the switch liquid crystal 203 propagates in accordance with the twist, and the polarization direction thereof rotates by 90 degrees.

The polarizing plate 204 that is disposed closer to the observer than the switching liquid crystal 203 has a horizontal polarization axis. Therefore, when no voltage is applied between the pair of transparent electrodes, the light emitted from the image display device 100 transmits through the polarizing plate 204, because the vertically polarized light output from the −¼ wavelength plate 202 propagates in accordance with the twist of the liquid crystal molecules, the polarization direction thereof is rotated by 90 degrees, and it is changed to horizontally polarized light. Further, if a voltage equal to or more than a threshold voltage is applied between the pair of transparent electrodes, the liquid crystal molecules are oriented such that a long axis thereof is oriented in the direction of an electric field. In this state, the liquid crystal molecules are not twisted. Therefore, the light output from the image display device 100 is maintained in a vertically polarized state, and is absorbed (blocked) by the polarizing plate 204.

As described above, when no voltage is applied to the switching liquid crystal 203, the right-handed circularly polarized light output from the image display device 100 is changed to the vertically polarized light by the −¼ wavelength plate 202 of the displayed image viewing glasses 200, and is transmitted through the switching liquid crystal 203 and the polarizing plate 204, thereby reaching the eyes of the observer. Thus, it is recognized by the observer. On the other hand, when a voltage is applied to the switching liquid crystal 203, the right-handed circularly polarized light output from the image display device 100 is changed to the vertically polarized light by the −¼ wavelength plate 202 of the displayed image viewing glasses 200. However, it is changed to the horizontally polarized light by the switching liquid crystal 203, and is thus absorbed by the polarizing plate 204.

In this manner, with respect to the light output from the image display device 100, the liquid crystal shutters 200a, 200b operate in a normally white mode. Therefore, with respect to the light output from the image display device 100, the light transmission and absorption by the displayed image viewing glasses 200 can be periodically performed by periodically applying a voltage to the switching liquid crystal 203. As a result, the displayed image viewing glasses 200 can perform a shutter operation of the liquid crystal shutters 200a, 200b.

On the other hand, the light output from an external luminous body such as a fluorescent lamp (hereinafter also referred to as "external light") is randomly polarized light, and the direction of polarization is not specified. Therefore, the external light remains in a random polarization state even after passing through the −¼ wavelength plate 202. Also when the external light passes through the switching liquid crystal 203, the external light remains in a random polarization state and does not change to a specific polarization state, both in a case where the direction of polarization changes depending on whether or not a voltage is applied to the transparent electrodes, and in a case where the direction of polarization does not change. Therefore, vibration components in a transmission axis direction (a lateral direction) alone are extracted by the polarizing plate 204 located closest to the observer. However, the lateral vibration components of the randomly polarized light constantly pass through the polarizing plate 204, regardless of whether or not a voltage is applied to the switching liquid crystal 203. Therefore, with respect to the external light, the displayed image viewing glasses 200 do not perform the shutter operation, and the lateral vibration components of the external light are constantly recognized by the eyes of the observer.

Therefore, the present embodiment makes it possible to realize the displayed image viewing glasses 200 which perform the shutter operation only for the light output from the image display device 100, and whose shutters do not function for external light. Therefore, since the liquid crystal shutters 200a, 200b do not substantially function for external light, the external light entering the displayed image viewing glasses 200 is recognized by the eyes of the observer with the frequency unchanged. Thus, it becomes possible to completely inhibit the occurrence of flicker.

Figure 7:
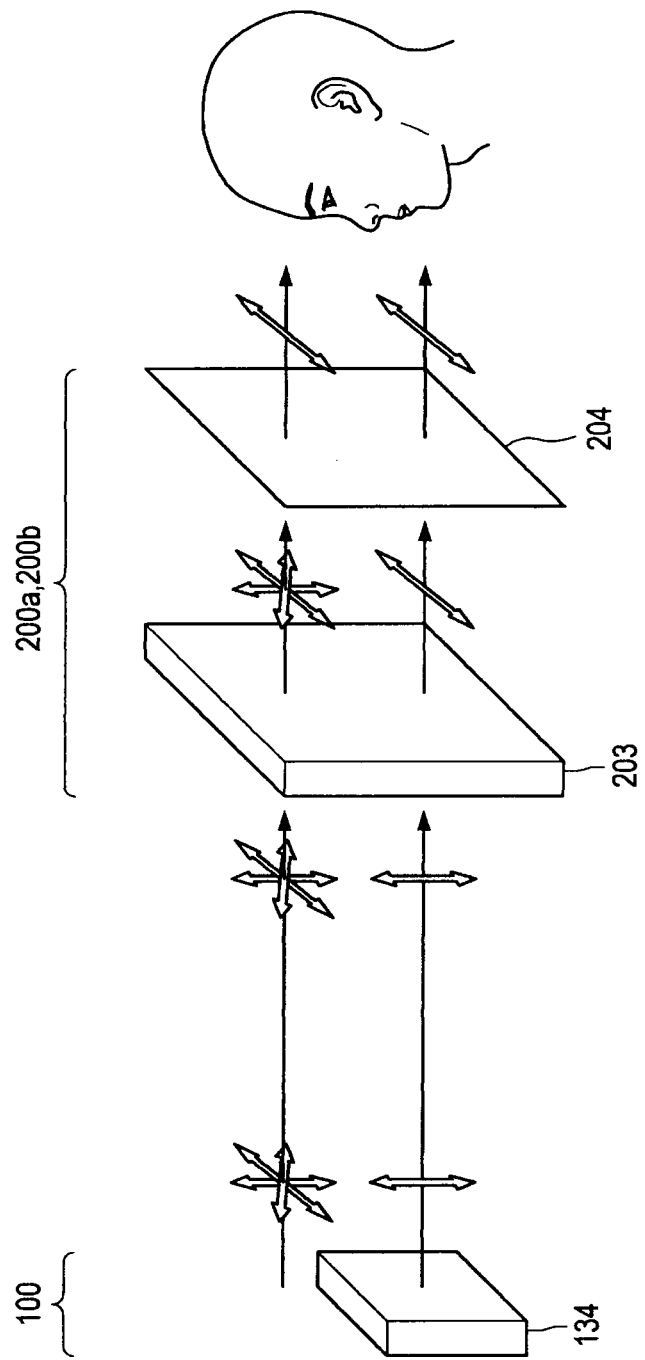
FIG. 7 is a schematic drawing that shows a structure obtained by removing a +¼ wavelength plate 114 and a −¼ wavelength plate 202 from the structure shown in FIG. 6.

FIG. 7 is a schematic drawing that shows a structure obtained by removing the +¼ wavelength plate 114 and the −¼ wavelength plate 202 from the structure shown in FIG. 6. Also in the configuration shown in FIG. 7, the light output from the image display device 100 enters the switching liquid crystal 203 in a vertically polarized state. Therefore, in a similar manner to FIG. 6, the shutter operation can be performed periodically for the light output from the image display device 100. On the other hand, the external light enters the switching liquid crystal 203 in a random polarization state, and enters the polarizing plate 204 in the random polarization state. Therefore, vibration components in the transmission axis direction (the lateral direction) of the external light constantly pass through the polarizing plate 204, regardless of whether a voltage is applied to the switching liquid crystal 203. Accordingly, also in the structure shown in FIG. 7, it is possible to realize the displayed image viewing glasses 200 whose shutters do not function for the external light. However, in the structure shown in FIG. 7, when the observer inclines his/her head, for example, the polarization direction of the light output from the image display device 100 differs from the orientation direction of the liquid crystal of the switching liquid crystal 203, so it can be assumed that the shutter operation is not performed properly. In this case, the light may not transmit in a shutter open state, or conversely the light may transmit in a shutter closed state, and there is a possibility of the occurrence of crosstalk in which the left and right images are mixed.

With the structure shown in FIG. 6, the polarized light output from the image display device 100 is converted to circularly-polarized light by providing the image display device 100 with the +¼ wavelength plate 114. Therefore, even when the observer who wears the displayed image viewing glasses 200 inclines his/her head, for example, the −¼ wavelength plate 202 and the switching liquid crystal 203 tilt together. Therefore, the polarization direction of the light entering the switching liquid crystal 203 does not change. Accordingly, it is possible to avoid an influence due to the inclination of the displayed image viewing glasses 200, and an accurate shutter operation can be performed constantly for the light output from the image display device 100.

Note that a normal liquid crystal shutter includes a polarizing plate that has a polarization axis in a predetermined direction, on a side closer to the image display device 100 than the switching liquid crystal 203, with respect to the structure shown in FIG. 7. With this structure, the polarizing plate operates for external light, and thus the external light is also converted to a predetermined polarized light and is incident on the switching liquid crystal 203. Therefore, the shutter operation by the liquid crystal shutters 200a, 200b functions also for the external light, and this becomes a factor of the above-described occurrence of flicker.

The liquid crystal shutters 200a, 200b of the displayed image viewing glasses 200 according to the present embodiment have been explained using an example of liquid crystals in a normally white mode in which light passes through them when a voltage is not applied. However, it is also possible to use liquid crystals in a normally black mode in which light is blocked when a voltage is not being applied. In that case, the contrast between when the liquid crystal shutters 200a, 200b are open and when they are closed can be further improved. On the other hand, when the liquid crystals in the normally white mode are used, it is possible to raise the light transmissivity.

Further, in the present embodiment, the relationship between the NTSC signal and the 50 Hz commercial frequency has been explained, but this applies also to relationship between PAL (Phase Alternation by Line) or SECAM (Sequential Couleur A memoire), which is other than NTSC, and commercial frequencies of 50 Hz, 60 Hz, or the like. Even in those cases, according to the configuration of the present embodiment, it is possible to suppress the occurrence of the flicker reliably.

Hence, according to the present embodiment, significant improvement can be made in suppressing the undulation phenomenon between the shutters that open and close cyclically in synchronization with video signals and the external light source that repeatedly turns on and off in a cycle that is close to the opening and closing cycle of the shutters. The external light source is not limited to the fluorescent lamp, but the same sort of flicker occurs even with LED illumination, illumination by display devices of various types of audio-video equipment, and the like. However, the flicker can be reliably suppressed with the configuration of the present embodiment. Among these external light sources, there are cases in which the individual devices have their own characteristic frequencies instead of the commercial frequencies, but the flicker can be reliably suppressed with the configuration of the present embodiment even for these external light sources.

6. Application to System that Cyclically Displays Multiple Different Images

Figure 8:
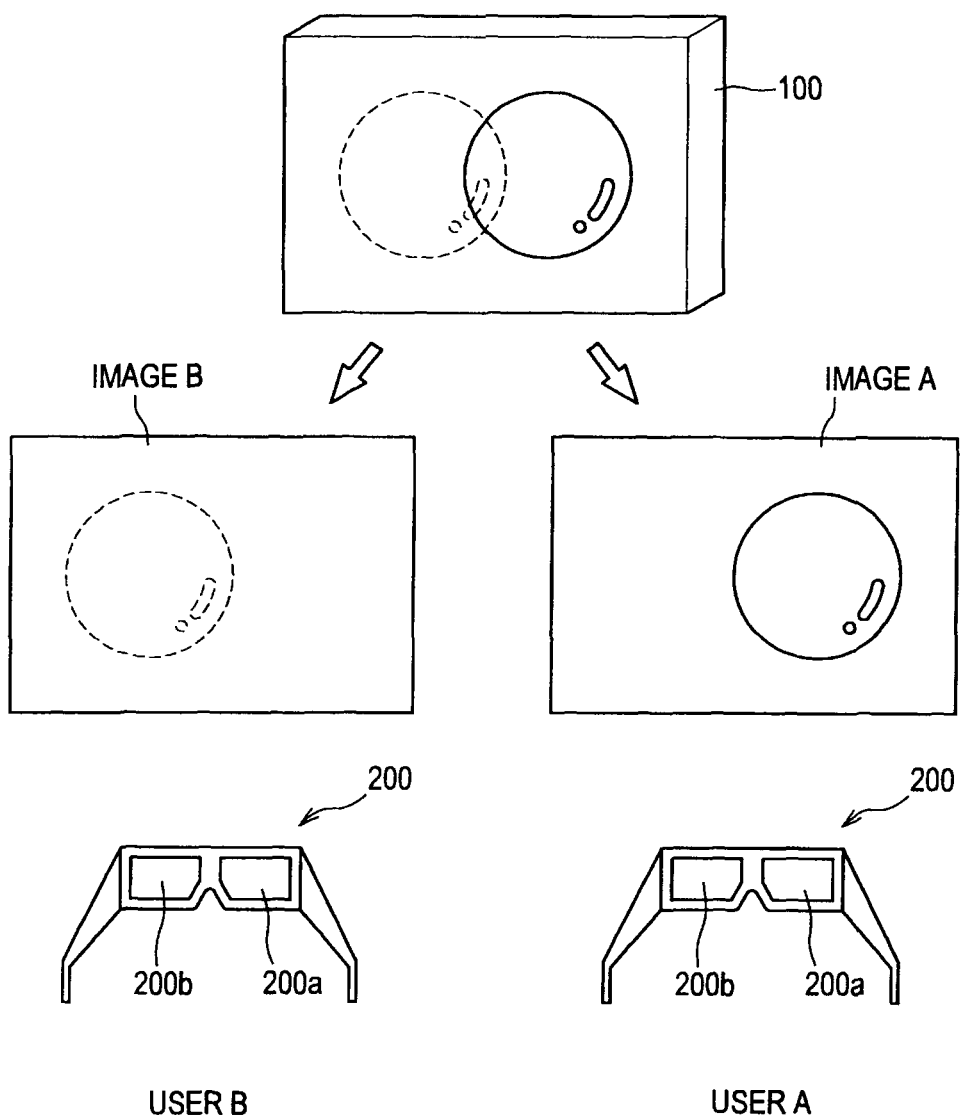
FIG. 8 is a schematic drawing that shows a dual view system that provides different video images to multiple users.

In the example as described above, the stereoscopic image display viewing system has been exemplified, but the present invention can be applied to any system that provides different video images to multiple users. FIG. 8 is a schematic drawing that shows a (dual view) system that provides different video images to multiple users. In this system, the liquid crystal shutters 200a, 200b of the displayed image viewing glasses 200 perform their opening and closing operations at the same timing. The image display device 100 may be a display device using time division scheme, for example, and may display a video image for a user A and a video image for a user B in alternation on the entire screen in an extremely short cycle.

In this case, in FIG. 3, the two types of images that are displayed on the image display device 100 are the image A for the user A and the image B for the user B, and of the two users, the user A perceives the image A, and the user B perceives the image B. The source of the video images that are displayed may be a 50 Hz in the case of PAL, for example.

The liquid crystal shutters 200a, 200b perform their opening and closing operations simultaneously, in synchronization with the switching of the images in the separate fields of the image display device 100. In other words, in FIG. 3, if the image A is the image for the user A, and the image B is the image for the user B, then for the field in which the image A is displayed on the image display device 100, the liquid crystal shutters 200a, 200b of the displayed image viewing glasses 200 that the user A is wearing are both in the open state. In contrast, the liquid crystal shutters 200a, 200b of the displayed image viewing glasses 200 that the user B is wearing are both in the closed state.

More specifically, first, in FIG. 3, the image A starts to be displayed on the image display device 100, and at the time when the liquid crystal response time has elapsed and the image A is completely displayed, the liquid crystal shutters 200a, 200b for the user A are brought into the open state. This makes it possible for the user A to perceive the image A. Next, when the image B starts to be displayed on the image display device 100, the liquid crystal shutters 200a, 200b for the user A are brought into the closed state, such that the transmission of the image B through the liquid crystal shutters 200a, 200b is cut off (blocked).

Further, for the field in which the image B is displayed on the image display device 100 for the user B, the liquid crystal shutters 200a, 200b of the displayed image viewing glasses 200 that the user B is wearing both are brought into the open state. In contrast, the liquid crystal shutters 200a, 200b of the displayed image viewing glasses 200 that the user A is wearing both are brought into the closed state.

That is, when the image B is completely displayed, the liquid crystal shutters 200a, 200b for the user B are brought into the open state, and the user B can perceive the image B. In contrast, the liquid crystal shutters 200a, 200b of the displayed image viewing glasses 200 that the user A is wearing both are brought into the closed state, so the user A cannot perceive the image B.

Thus, the image display device 100 displays the image A for the user A and the image B for the user B on the entire screen in alternation in an extremely short cycle, and the liquid crystal shutters 200a, 200b for each of the users open and close in synchronization with the display timing for the image A and the image B. This makes it possible to provide different images to the user A and the user B. Also in the example of FIG. 8, with the principle of the "write twice" which was explained in FIG. 4, for each of the image A and the image B, the same images of the image A and the image B are displayed at least twice or more consecutively. This makes it possible to prevent reliably the image A from mixing into the image B perceived by a user or to prevent reliably the image B from mixing into the image A perceived by a user.

Besides, in FIG. 8, a case of two users is exemplified, but the same sort of configuration can also be applied to a case where there are more users. In the example as described above, two types of video images are displayed, so the images are displayed by dividing a single vertical synchronization period into two parts, but it is also possible to display no less than three video images simultaneously by dividing the vertical synchronization period into no less than three parts, thus providing different images to a greater number of users.

As described above, according to the present embodiment, with respect to the external light that is considered to have random polarization, the polarized light output from the image display device 100 is changed to a specific state, and a difference between them is used. The image and the external light are separated using polarization in this manner. Thus, it is possible to cause the shutters to function only for the polarized light derived from the display screen, while the shutter function does not operate for the external light. As a result, it is possible to reliably eliminate flicker caused by an external light source such as a fluorescent lamp. Further, the image A and the image B are displayed such that the same image is displayed at least twice or more consecutively. Thus, it becomes possible to reliably inhibit the problem of crosstalk in which the image A and the image B are mixed and visually recognized by the user.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-225964 filed in the Japan Patent Office on Sep. 30, 2009, the entire content of which is hereby incorporated by reference.

What is claimed is:
1. An image display viewing system comprising:
an image display device that comprises:
a signal control portion configured to receive input of an image signal and output a signal that causes each of multiple different images to be displayed at least twice consecutively; and
a display panel configured to receive the signal output from the signal control portion and alternately display each of the multiple different images; and
an optical modulator that comprises:
a liquid crystal layer on which light corresponding to a first image output from the image display device and having a predetermined polarization direction, and external light having random polarization are incident, wherein the liquid crystal layer comprises a pair of transparent electrodes on a front surface and a rear surface of the liquid crystal layer; and
a polarizing plate on which light emitted from the liquid crystal layer is incident and which has a polarization axis in a predetermined direction,
wherein when no voltage is applied to the pair of transparent electrodes, the external light remains in the random polarization state after passing through the liquid crystal layer, and the polarization direction of the light that is output from the image display device is rotated such that the light emitted from the liquid crystal layer is transmitted through the polarizing plate.

2. The image display viewing system according to claim 1,
wherein the image display device comprises a first ¼ λ wavelength plate configured to convert the first image having the predetermined polarization direction to circularly polarized light, and
wherein the optical modulator comprises a second ¼ λ wavelength plate which is disposed closer to the image display device than the liquid crystal layer and which converts the circularly polarized light to the predetermined polarization direction.

3. The image display viewing system according to claim 1, wherein the liquid crystal layer rotates the polarization direction of the light output from the image display device when a voltage is applied, and controls transmission and non-transmission of light through the polarizing plate.

4. The image display viewing system according to claim 3,
wherein the optical modulator is disposed in front of a right eye and in front of a left eye of an observer, wherein the multiple different images comprises a second image for the right eye that is visually recognized by the right eye and a third image for the left eye that is visually recognized by the left eye, and
wherein the liquid crystal layer controls the transmission and non-transmission of the light through the polarizing plate such that the second image for the right eye is incident on the right eye and the third image for the left eye is incident on the left eye, in response to switching between the second image for the right eye and the third image for the left eye that are periodically output from the image display device.

5. The image display viewing system according to claim 3,
wherein the optical modulator is disposed in front of a right eye and in front of a left eye of an observer, wherein the multiple different images comprises images that are visually recognized by different users, respectively, and
wherein the transmission and non-transmission of light through the polarizing plate is controlled such that one of the multiple different images is incident on both the right eye and the left eye, in response to switching between the multiple different images that are periodically output from the image display device.

6. An optical modulator comprising:
a liquid crystal layer on which light corresponding to images, having a predetermined polarization direction, is periodically output from an image display device and external light having random polarization are incident, wherein the images comprise multiple different images that are each output at least twice consecutively,
wherein the liquid crystal layer comprises a pair of transparent electrodes on a front surface and a rear surface of the liquid crystal layer; and
a polarizing plate on which light emitted from the liquid crystal layer is incident and which has a polarization axis in a predetermined direction,
wherein when no voltage is applied to the pair of transparent electrodes, the external light remains in the random polarization state after passing through the liquid crystal layer, and the polarization direction of the light that is output from the image display device is rotated such that the light emitted from the liquid crystal layer is transmitted through the polarizing plate.

7. The optical modulator according to claim 6,
wherein the images output from the image display device comprise images of circularly polarized light converted from the images having the predetermined polarization direction, and
wherein the optical modulator comprises a ¼ λ wavelength plate which is disposed closer to the image display device than the liquid crystal layer and which converts the circularly polarized light to the predetermined polarization direction.

8. The optical modulator according to claim 6, wherein the liquid crystal layer rotates the polarization direction of the light output from the image display device when a voltage is applied, and controls transmission and non-transmission of the light through the polarizing plate.

9. The optical modulator according to claim 8,
wherein the optical modulator is disposed in front of a right eye and in front of a left eye of an observer, wherein the multiple different images comprise a first image for the right eye that is visually recognized by the right eye and a second image for the left eye that is visually recognized by the left eye, and
wherein the liquid crystal layer controls the transmission and non-transmission of the light through the polarizing plate such that the first image for the right eye is incident on the right eye and the second image for the left eye is incident on the left eye, in response to switching between the first image for the right eye and the second image for the left eye that are periodically output from the image display device.

10. The optical modulator according to claim 8,
wherein the optical modulator is disposed in front of a right eye and in front of a left eye of an observer,
wherein the multiple different images comprise images that are visually recognized by different users, respectively, and
wherein the transmission and non-transmission of the light through the polarizing plate is controlled such that one of the multiple different images is incident on both the right eye and the left eye, in response to switching between the multiple different images that are periodically output from the image display device.

11. An image display device comprising:
a signal control portion configured to receive input of an image signal and output a signal that causes each of multiple different images to be displayed at least twice consecutively;
a display panel configured to receive the signal output from the signal control portion and alternately display each of the multiple different images; and
a first ¼ λ wavelength plate configured to convert polarized light of the multiple different images to circularly polarized light,
wherein the image display device outputs the multiple different images to an optical modulator that comprises, on a front surface of a liquid crystal layer, a second ¼ λ wavelength plate converting the circularly polarized light to a predetermine d polarization direction and performs a shutter operation by the liquid crystal layer, and
wherein the liquid crystal layer comprises a pair of transparent electrodes on a front surface and a rear surface of the liquid crystal layer,
wherein when no voltage is applied to the pair of transparent electrodes, external light from an external light source remains in a random polarization state after passing through the liquid crystal layer, and the polarization direction of light output from the image display device is rotated such that the light emitted from the liquid crystal layer is transmitted through the polarizing plate.

12. The image display device according to claim 11, wherein the multiple different images comprise a first image for a right eye that is visually recognized by the right eye and a second image for a left eye that is visually recognized by the left eye.

13. The image display device according to claim 11, wherein the multiple different images comprise images that are visually recognized by different users, respectively.

14. The image display viewing system according to claim 1, wherein the optical modulator comprises first and second liquid crystal shutters each of which is opened for a predetermined time period, the predetermined time period being set before switching timing at which a second image for a right eye switches to a third image for a left eye.

15. The image display viewing system according to claim 14, wherein a predefined luminance is reached by displaying the second image from the multiple different images for a first time and the predefined luminance is maintained while displaying the second image for a second time.

* * * * *